March 24, 1931.  F. H. RAGAN  1,797,444
BEARING AND METHOD OF MAKING SAME
Filed April 20, 1928
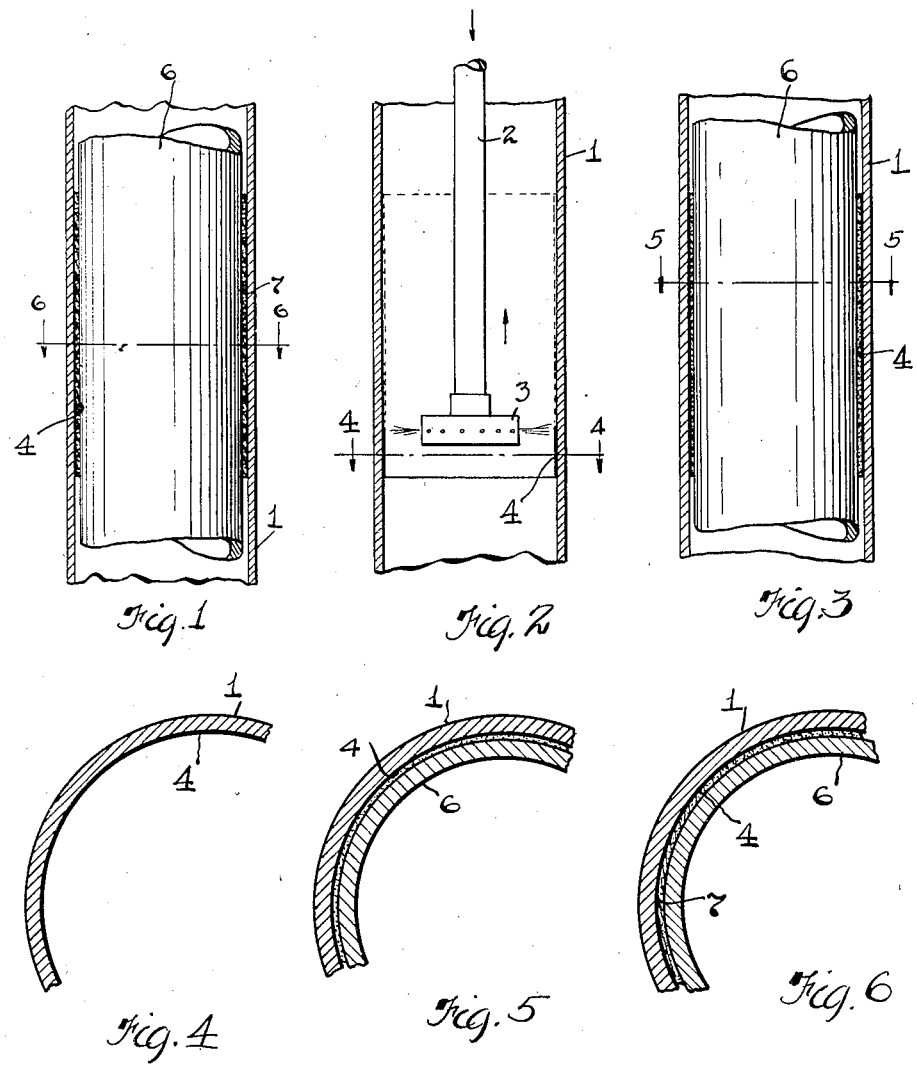
INVENTOR.
Frederick H. Ragan
BY
Fay, Oberlin & Fay
ATTORNEYS Patented Mar. 24, 1931

1,797,444

UNITED STATES PATENT OFFICE

FREDERICK H. RAGAN, OF SHAKER HEIGHTS, OHIO, ASSIGNOR TO THE COLUMBIA AXLE COMPANY, OF CLEVELAND, OHIO, A CORPORATION OF OHIO

BEARING AND METHOD OF MAKING SAME

Application filed April 20, 1928. Serial No. 271,468.

The present invention, relating as indicated to bearings and a method of making same, is particularly directed to an improved type of yieldable bearing for use between any two concentrically disposed elements, such for example as a tube and shaft, housing and shaft, or two tubular members, where the bearing pressure is relatively light and where silence and low cost are more important factors than resistance to heavy bearing pressure, and also to a simple, rapid and economical method of making such a bearing. In steering columns for motor vehicles there are ordinarily one or more control rods which are passed down through the surrounding tubular column or sleeve for connection to elements running to the carburetor control, ignition control, etc. It is a matter of extreme difficulty to produce bearings which will adequately journal these small shafts or tubes in the steering column proper, while at the same time maintaining silence over a long period, preventing undue resistance in the operation of the shafts and reducing the cost of making and mounting such bearings to a reasonable amount. I have produced a bearing which is capable of being very rapidly formed in position in the surrounding housing or tube and which, when formed, will yieldably journal a rod or shaft therein, and at the same time provide an adequate support for said shaft against the relatively low pressure which is exerted thereby. My improved bearing is simple, easily applied and capable of maintaining silence over a very considerable period.

To the accomplishment of the foregoing and related ends, said invention then, consists of the means hereinafter fully described and particularly pointed out in the claims; the annexed drawing and the following description setting forth in detail one method and one product exemplifying my invention, such disclosed procedure and product constituting, however, but one of various applications of the principles of my invention.

In said annexed drawing:—

Fig. 1 is a central longitudinal section through a column or housing provided with my improved bearing and journaling a shaft enclosed therein; Fig. 2 is a similar view showing the inital operation in the forming of such a bearing; Fig. 3 is a similar view illustrating the bearing when completed; Fig. 4 is a transverse sectional view of the surrounding sleeve after the application of the cementitious material thereto on the plane 4—4 of Fig. 2; Fig. 5 is a section on the line 5—5, Fig. 3; and Fig. 6 is a section on the line 6—6, Fig. 1.

My improved bearing consists of granular compressible material mounted within a surrounding tube and cemented thereto, the material being substantially of a size equivalent to the thickness between the wall of the surrounding member and the shaft to be journaled therein. For illustration, and by reference to Fig. 2, there is shown a tubular element 1 representing the surrounding housing or tube, within which I introduce a spraying device, of which I have shown a tube 2 and an apertured spray head 3 adapted to spray any suitable cementitious material in thick liquid form over that portion of the wall surface on which it is desired to build up a bearing. Thus, in Fig. 2 the portion 4 of the wall of the member 1 has been sprayed with cementitious material in a relatively thick condition, and of course any suitable length of wall may be similarly treated, or various spaced portions of the wall may be treated with this cement.

Before the cement is set I introduce granular material, such as ground or powdered cork or a mixture of cork and a solid lubricant, such as graphite, by allowing the material either to flow through the tubular element 1 or by blowing or otherwise applying the material directly to the cement covered portions of the tube surface. The material adheres all over the cement covered portions of the wall, and by supplying cork or other material of a size corresponding to the clearance between the surrounding tube and the shaft to be journaled therein, the thickness of the layer of cork and cement will be very slightly more than the desired clearance. After the cement is set the shaft 6, which is to be journaled in the tubular element 1, is pushed through the latter and as the material of the bearing 7 (see Fig. 1) is compressible, it will give sufficiently to allow the shaft to be pressed through, but will provide a yielding grip upon the shaft which will tend to maintain it against oscillation with a slight drag, but will permit it to be freely oscillated or rotated when desired.

The compressible material may take the form either of cork or a mixture of cork and graphite, or cork coated with graphite, or some similar equivalent material may be employed which will have a sufficient compressibility to provide a slight pressure on the shaft and to resist any tendency to cant angularly of the enclosed tube, which would cause it to strike against the metal of the tube wall.

My improved bearing is extremely inexpensive, and by reason of its low cost a number of such bearings may be built up in a tube at very little expense, or if desired the entire length of the enclosing tube may be formed into a bearing by successive applications of cement and compressible material. The tests show that a shaft so mounted in a tube is very effectively journaled and while there is of course a slight drag against the oscillation or rotation of the shaft this is not a disadvantage but a desirable feature in the journaling of small rods or shafts in steering columns.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. A bearing consisting of a rigid plate and a substantial layer of granular compressible material cemented thereto.

2. A bearing consisting of a cylindrical shell, a layer of cementitious material applied thereto, and a layer of granular compressible material embedded in such cementitious material.

3. A bearing consisting of a tubular cylindrical metal shell, an annular ring of cementitious material applied to the inner surface thereof, and granular compressible material embedded in such cementitious material and secured thereby to the surrounding metal tube.

4. A bearing consisting of a cylindrical metal shell, a ring of cementitious material secured to the inner surface of said shell, and a layer of granular compressible material embedded in said cementitious material, the particles of granular material extending slightly into the path of the shaft to be journaled therein whereby compression of said particles occurs upon the installation of said shaft.

5. A bearing consisting of a rigid plate, and a layer of granular cork cemented thereto.

6. A bearing consisting of a rigid wall, and a composite layer of a compressible material and a solid lubricant cemented thereto.

Signed by me, this 17 day of April, 1928.
FREDERICK H. RAGAN.